United States Patent
Song et al.

(10) Patent No.: US 9,912,006 B2
(45) Date of Patent: Mar. 6, 2018

(54) METHOD OF MANUFACTURING COMPOSITE POSITIVE ACTIVE MATERIAL, COMPOSITE POSITIVE ACTIVE MATERIAL MANUFACTURED THEREBY, AND POSITIVE ELECTRODE AND LITHIUM BATTERY INCLUDING THE COMPOSITE POSITIVE ACTIVE MATERIAL

(71) Applicant: Samsung SDI Co., Ltd., Yongin-si, Gyeonggi-Do (KR)

(72) Inventors: Jay-Hyok Song, Yongin-si (KR); Andrei Kapylou, Yongin-si (KR); Jun-Seok Park, Yongin-si (KR); Chang-Wook Kim, Yongin-si (KR); Yong-Chan You, Yongin-si (KR); Sun-Ho Kang, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 686 days.

(21) Appl. No.: 14/456,986

(22) Filed: Aug. 11, 2014

(65) Prior Publication Data

US 2015/0210557 A1    Jul. 30, 2015

(30) Foreign Application Priority Data

Jan. 24, 2014    (KR) .................. 10-2014-0009163

(51) Int. Cl.
*H01M 4/00* (2006.01)
*H01M 10/052* (2010.01)
(Continued)

(52) U.S. Cl.
CPC .......... *H01M 10/052* (2013.01); *C01G 45/12* (2013.01); *C01G 53/50* (2013.01); *H01M 4/505* (2013.01);
(Continued)

(58) Field of Classification Search
CPC ....................................................... H01M 4/00
See application file for complete search history.

(56) References Cited

U.S. PATENT DOCUMENTS 7,635,536 B2    12/2009    Johnson et al.
7,732,096 B2    6/2010    Thackeray et al.
(Continued)

FOREIGN PATENT DOCUMENTS

KR    10-2012-0030951    3/2012
(A)

OTHER PUBLICATIONS

Kim et al. "Nanostructure cathode materials prepared by high-energy ball milling method" Materials Letters vol. 65 iss. 21-22 pp. 3313-3316, pub. Nov. 2011).*

(Continued)

*Primary Examiner* — Jacob Marks
(74) *Attorney, Agent, or Firm* — Knobbe Martens Olson & Bear LLP

(57) ABSTRACT

Provided are a method of manufacturing a composite positive active material, a composite positive active material manufactured by the method, and a positive electrode and a lithium battery including the composite positive active material. The method may include acid-treating an overlithiated lithium transition metal oxide; and applying fluorine onto the acid-treated overlithiated lithium transition metal oxide using a fluorine compound.

19 Claims, 3 Drawing Sheets

(51) Int. Cl.
- H01M 4/525 (2010.01)
- H01M 4/505 (2010.01)
- C01G 45/12 (2006.01)
- C01G 53/00 (2006.01)

(52) U.S. Cl.
CPC ......... *H01M 4/525* (2013.01); *C01P 2002/50* (2013.01); *C01P 2004/03* (2013.01); *C01P 2006/40* (2013.01); *Y02T 10/7011* (2013.01)

(56) References Cited

U.S. PATENT DOCUMENTS

| | | | |
|---|---|---|---|
| 8,148,011 | B2 | 4/2012 | Thackeray et al. |
| 2006/0188781 | A1* | 8/2006 | Thackeray ............ H01M 4/131 429/231.1 |
| 2011/0183216 | A1* | 7/2011 | Kim ................... H01M 10/052 429/338 |
| 2013/0189578 | A1 | 7/2013 | Oh, et al. |

OTHER PUBLICATIONS

Amine et al., "Impacts of fluorine on the electrochemical properties of Li[Ni$_{0.5}$Mn$_{0.5}$]O$_2$ and Li[Li$_{0.2}$Ni$_{0.15}$Co$_{0.1}$Mn$_{0.55}]O_2$," *Journal of Fluorine Chemistry* 128 (2007) pp. 263-268.

Kang et al., "Layered Li(Li$_{0.2}$Ni$_{0.15+0.5z}$Co$_{0.10}$Mn$_{0.55-0.5z}$)O$_{2-z}$F$_z$ cathode materials for Li-ion secondary batteries," *Journal of Power Sources* 146 (2005) pp. 654-657.

Kang et al., "The Effects of Acid Treatment on the Electrochemical Properties of 0.5 Li$_2$MnO$_3$·0.5 LiNi$_{0.44}$Co$_{0.25}$Mn$_{0.31}$O$_2$ Electrodes in Lithium Cells," *Journal of the Electrochemical Society*, 153 (6) A1186-A1192 (2006).

\* cited by examiner

METHOD OF MANUFACTURING COMPOSITE POSITIVE ACTIVE MATERIAL, COMPOSITE POSITIVE ACTIVE MATERIAL MANUFACTURED THEREBY, AND POSITIVE ELECTRODE AND LITHIUM BATTERY INCLUDING THE COMPOSITE POSITIVE ACTIVE MATERIAL

INCORPORATION BY REFERENCE TO ANY PRIORITY APPLICATIONS

Any and all priority claims identified in the Application Data Sheet, or any correction thereto, are hereby incorporated by reference under 37 CFR 1.57. For example, this application claims the benefit of Korean Patent Application No. 10-2014-0009163, filed on Jan. 24, 2014, in the Korean Intellectual Property Office, the disclosure of which is incorporated herein in its entirety by reference.

BACKGROUND

Field

One or more embodiments of the present disclosure relate to a method of manufacturing a composite positive active material, a composite positive active material manufactured thereby, and a positive electrode and a lithium battery including the composite positive active material.

Description of the Related Technology

A typical positive active material for a lithium battery is a transition metal compound or an oxide of a transition metal and lithium, such as $LiNiO_2$, $LiCoO_2$, $LiMn_2O_4$, $LiFePO_4$, $LiNi_xCo_{1-x}O_2$ (wherein $0 \leq x \leq 1$), and $LiNi_{1-x-y}Co_xMn_yO_2$ (wherein $0 \leq x \leq 0.5$ and $0 \leq y \leq 0.5$). However, such a positive active material has a limited electrical capacity.

Therefore, there is a demand for a novel positive active material having a variety of structures. In particular, a composite oxide is being presented as an alternative positive active material for a high capacity battery.

For example, the composite oxides may be $Li_2MO_3$—$LiMeO_2$ (wherein M and Me are transition metals) that has a layer structure. The composite oxide having the layer structure may be, capable of intercalating/deintercalating lithium (Li) ions in a fundamentally large amount, in comparison with other types of positive active materials. Accordingly, the composite oxide having the layer structure may have a high capacity property. However, an existing composite oxide that has a layer structure has a low rate property due to the low levels of electrical and ion conductivities of $Li_2MO_3$.

Therefore, in order to apply a positive active material to a battery for vehicles or the like, a positive active material that has a high capacity and has improved a rate property is still demanded.

SUMMARY

One or more embodiments include a method of manufacturing a composite positive active material that improves a rate property.

One or more embodiments include a composite positive active material manufactured according to the method above.

One or more embodiments include a positive electrode including the composite positive active material.

One or more embodiments include a lithium battery including the positive electrode.

Additional aspects will be set forth in part in the description which follows and, in part, will be apparent from the description, or may be learned by practice of the presented embodiments.

According to one or more embodiments, a method of manufacturing a composite positive active material includes:

acid-treating an overlithiated lithium transition metal oxide that is represented by Formula 1 or 2 below; and applying a fluorine doping onto the acid-treated overlithiated lithium transition metal oxide using a fluorine compound:

$xLi_2MO_3\text{-}(1-x)LiM'O_2$      Formula 1 wherein M may have an average oxidation number +4 and may be at least one metal selected from a Group 4 transition metal and a Group 5 transition metal of the Periodic Table of element, M' may have an average oxidation number +3 and may be at least one metal selected from a Group 4 transition metal and a Group 5 transition metal of the Periodic Table of element, and $0 < x < 1$

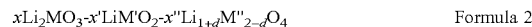
$xLi_2MO_3\text{-}x'LiM'O_2\text{-}x''Li_{1+d}M''_{2-d}O_4$      Formula 2 wherein M may have an average oxidation number +4 and may be at least one metal selected from a Group 4 transition metal and a Group 5 transition metal of the Periodic Table of element, M' may have an average oxidation number +3 and may be at least one metal selected from a Group 4 transition metal and a Group 5 transition metal of the Periodic Table of element, M" may have mixed average oxidation numbers +3 and +4 and may be at least one metal selected from a Group 4 transition metal and a Group 5 transition metal of the Periodic Table of element, and $x+x'+x''=1$; $0<x<1$, $0<x'<1$, $0<x''<1$; and $0 \leq d \leq 0.33$.

In some embodiments, M may be at least one metal selected from manganese (Mn), titanium (Ti), zirconium (Zr), tin (Sn), and molybdenum (Mo).

In some embodiments, M' may be at least one metal selected from nickel (Ni), cobalt (Co), manganese (Mn), iron (Fe), aluminum (Al), magnesium (Mg), zinc (Zn), copper (Cu), chromium (Cr), vanadium (V), and niobium (Nb).

In some embodiments, the overlithiated lithium transition metal oxide may be represented by Formula 3:

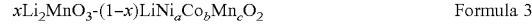
$xLi_2MnO_3\text{-}(1-x)LiNi_aCo_bMn_cO_2$      Formula 3 wherein $0<x<1$, $0<a<1$, $0<b<1$, $0<c<1$, and $a+b+c=1$. In some embodiments, the overlithiated lithium transition metal oxide may be $0.55Li_2MnO_3\text{-}0.45LiNi_{0.5}Co_{0.2}Mn_{0.3}O_2$.

In some embodiments, the overlithiated lithium transition metal oxide may have an average particle diameter in a range of about 10 nm to about 500 μm.

In some embodiments, the acid-treating of the overlithiated lithium transition metal oxide may be performed by using a solution containing at least one acid selected from nitric acid, sulfuric acid, hydrochloric acid, citric acid, fumaric acid, maleic acid, boric acid ($H_3BO_3$), and phosphoric acid. In some embodiments, the acid-treating of the overlithiated lithium transition metal oxide may be performed by using a solution containing nitric acid.

Between the acid-treating of the lithiated transition metal oxide and the applying of the fluorine doping onto the acid-treated overlithiated lithium transition metal oxide, the method may further include drying the acid-treated overlithiated lithium transition metal oxide at a temperature in a range of about 100° C. to about 200° C.

In some embodiments, the applying of the fluorine doping onto the acid-treated overlithiated lithium transition metal oxide may be performed by using a doping solution containing at least one fluorine compound selected from lithium fluoride (LiF), magnesium fluoride ($MgF_2$), strontium fluoride ($SrF_2$), beryllium fluoride ($BeF_2$), calcium fluoride ($CaF_2$), ammonium fluoride ($NH_4F$), ammonium bifluoride ($NH_4HF_2$), and ammonium hexafluoroaluminate (($NH_4$)$_3$ $AlF_6$). In some embodiments, the applying of the fluorine doping onto the acid-treated overlithiated lithium transition metal oxide may be performed by using a doping solution containing at lithium fluoride (LiF) or ammonium fluoride ($NH_4F$).

In some embodiments, the fluorine compound may be contained in the doping solution at a weight ratio in a range of about 0.01 wt % to about 10 wt % based on a total weight of the doping solution.

In some embodiments, the method may further include heat-treating the fluorine doped overlithiated lithium transition metal oxide in air at a temperature in a range of about 200° C. to about 500° C.

According to another embodiment, a composite positive active material is manufactured according to the method described above.

In some embodiments, the composite positive active material may include fluorine that is distributed in an inner surface of particles forming the composite positive active material.

According to another embodiment, a lithium battery includes: a positive electrode including the composite positive active material; a negative electrode disposed opposite to the positive electrode; and an electrolyte interposed between the positive electrode and the negative electrode.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
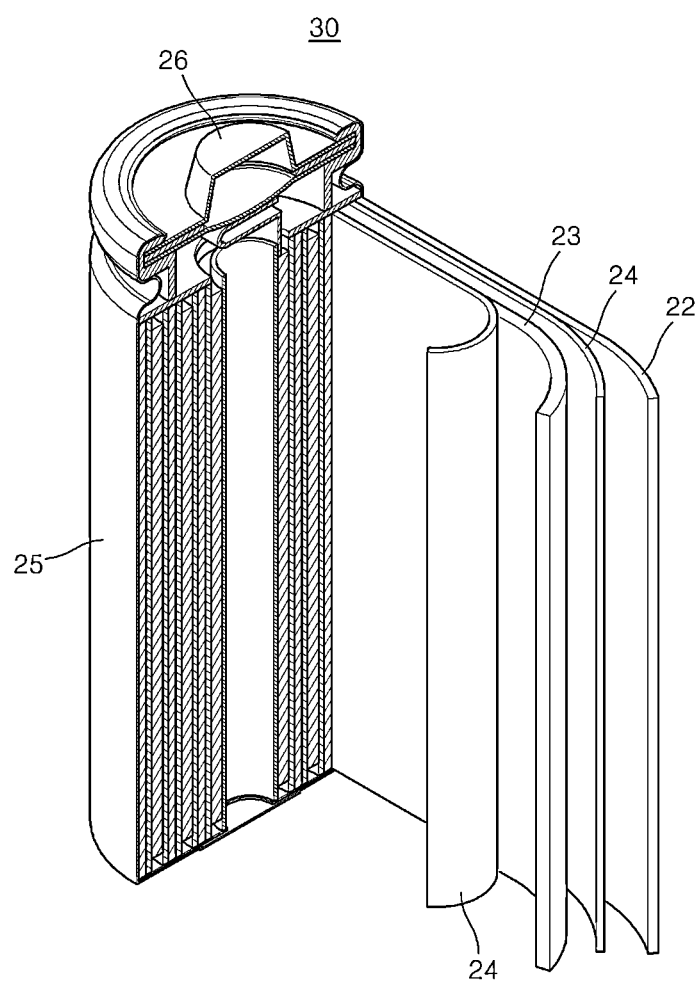
FIG. 1 is a schematic view illustrating a structure of a lithium battery manufactured according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, the present embodiments are described in greater detail.

A method of manufacturing a composite positive active material according to an embodiment may include:

acid-treating an overlithiated lithium transition metal oxide that is represented by Formula 1 or 2 below; and applying fluorine onto the acid-treated overlithiated lithium transition metal oxide using a fluorine compound:

$xLi_2MO_3$-$(1-x)LiM'O_2$ <span>Formula 1</span> wherein M may have an average oxidation number +4 and may be at least one metal selected from a Group 4 transition metal and a Group 5 transition metal of the Periodic Table, M' may have an average oxidation number +3 and may be at least one metal selected from a Group 4 transition metal and a Group 5 transition metal of the Periodic Table, and, $0<x<1$ $xLi_2MO_3$-$x'LiM'O_2$-$x''Li_{1+d}M''_{2-d}O_4$ <span>Formula 2</span> wherein M may have an average oxidation number +4 and may be at least one metal selected from a Group 4 transition metal and a Group 5 transition metal of the Periodic Table, M' may have an average oxidation number +3 and may be at least one metal selected from a Group 4 transition metal and a Group 5 transition metal of the Periodic Table, M" may have a mixed oxidation numbers +3 and +4 and may be at least one metal selected from a Group 4 transition metal and a Group 5 transition metal of the Periodic Table, and $x+x'+x''=1$; $0<x<1$, $0<x'<1$, $0<x''<1$; and $0 \leq d \leq 0.33$.

Here, x, x', x" and d may be set to a molar basis, and x may be $0<x<0.6$.

In some embodiments, the lithium transition metal oxide may be in a form of a composite having a layer structure, or may be in a form of a solid solution. In some embodiments, the lithium transition metal oxide may be in a form of a combination of the composite and the solid solution.

In some embodiments, the lithium transition metal oxide is a compound that contains Li in an excessive amount within a transition metal layer of $LiM'O_2$. Here, the Li atoms are in a form of $Li_2MO_3$, and $Li_2MO_3$ is contained in $LiM'O_2$ that has a layer structure. Following the acid-treating of the overlithiated lithium transition metal oxide and the applying of the fluorine onto the acid-treated overlithiated lithium transition metal oxide, a lithium battery including the composite positive active material may have improved a rate property by extending a length of a c-axis that is significantly relevant to the rate property.

In some embodiments of Formula 1, M may be at least one metal selected from manganese (Mn), titanium (Ti), zirconium (Zr), tin (Sn), and molybdenum (Mo), and M' may be at least one metal selected from nickel (Ni), cobalt (Co), manganese (Mn), iron (Fe), aluminum (Al), magnesium (Mg), zinc (Zn), copper (Cu), chromium (Cr), vanadium (V), and niobium (Nb).

In some embodiments the overlithiated transition metal oxide may be represented by Formula 3 below:

$xLi_2MnO_3$-$(1-x)LiNi_aCo_bMn_cO_2$ <span>Formula 3</span> wherein $0<x<1$, $0<a<1$, $0<b<1$, $0<c<1$, and $a+b+c=1$.

For example, the overlithiated lithium transition metal oxide may be represented by Formula 2:

$xLi_2MO_3$-$x'LiM'O_2$-$x''Li_{1+d}M''_{2-d}O_4$ <span>Formula 2</span> wherein M may have an average oxidation number +4 and may be at least one metal selected from a Group 4 transition metal and a Group 5 transition metal of the Periodic Table, M' may have an average oxidation number +3 and may be at least one metal selected from a Group 4 transition metal and a Group 5 transition metal of the Periodic Table, M" may have a mixed oxidation numbers +3 and +4 and may be at least one metal selected from a Group 4 transition metal and a Group 5 transition metal of the Periodic Table, and $$x+x'+x''=1;\ 0<x<1,\ 0<x'<1,\ 0<x''<1;\ \text{and}\ 0\leq d\leq 0.33.$$

In some embodiments of Formula 2, M may be, for example, at least one metal selected from Mn, Ti, Zr, Sn, and M, M' may be, for example, at least one metal selected from Ni, Co, Mn, Fe, Al, Mg, Zn, Cu, Cr, V, and Nb, and M" may be, for example, at least one metal selected from Ni, Co, Mn, Fe, Al, Mg, Zn, Cu, Cr, V, and Nb.

In some embodiments, the overlithiated lithium transition metal oxide may be represented by Formula 5 or 6, in addition to the above-described Formulae:

$$Li[Li_xMe_y]O_{2+d} \qquad \text{Formula 5}$$

wherein x+y=1, 0<x<1, and 0≤d≤0.1, and Me may be at least one metal selected from Mn, V, Cr, Fe, Co, Ni, Zr, rhenium (Re), Al, boron (B), germanium (Ge), ruthenium (Ru), Sn, Ti, Nb, Mo, and platinum (Pt), $$Li[Li_xNi_aCo_bMn_c]O_{2+d} \qquad \text{Formula 6}$$

wherein x+a+b+c=1; 0<x<1, 0<a<1, 0<b<1, 0<c<1; and 0≤d≤0.1.

In some embodiments, the overlithiated lithium transition metal oxide may contain fluorine. In some embodiments, the fluoride-containing overlithiated lithium transition metal oxide may have a high capacity property, and at the same time, have an excellent lifetime property. In some embodiments, the overlithiated lithium transition metal oxide may contain fluorine at a mole ratio of 10 mol % or less based on a total mole of the transition metals contained in the overlithiated lithium transition metal oxide.

In some embodiments, the overlithiated lithium transition metal oxide may have an average particle diameter in a range of about 10 nm to about 500 μm.

For example, the overlithiated lithium transition metal oxide may have an average particle diameter in a range of about 10 nm to about 100 μm, or more particularly about 10 nm to about 50 μm. When the overlithiated lithium transition metal oxide has the average particle diameter within the above ranges, a lithium battery including the overlithiated lithium transition metal oxide may have improved a physical property. Furthermore, the overlithiated lithium transition metal oxide may be in a form of nanoparticles having an average particle diameter of about 500 nm or less, about 200 nm or less, about 100 nm or less, about 50 nm or less, or about 20 nm or less. In some embodiments, the form of nanoparticles may improve a mixture density of a positive electrode plate, and accordingly, the overlithiated lithium transition metal oxide in such a form may have a good high-rate discharge property. In addition, due to a decrease in a specific surface area, the overlithiated lithium transition metal oxide may have low reactivity to an electrolyte aqueous solution, and accordingly, may have improved a charge and discharge cycle of a lithium battery.

In some embodiments, the overlithiated lithium transition metal oxide may form primary particles or secondary particles by aggregation or combination of the primary particles. Alternatively, the overlithiated lithium transition metal oxide may form secondary particles by a combination with other active materials.

In some embodiments, the acid-treating of the overlithiated lithium transition metal oxide having the layer structure may be performed by using a solution containing acid, and non-limiting examples of the acid include nitric acid, sulfuric acid, hydrochloric acid, citric acid, fumaric acid, maleic acid, boric acid ($H_3BO_3$), or phosphoric acid. Here, the acid may have a concentration in a range of about 0.01 M to about 5 M. Alternatively, the acid may be diluted with water or an alcohol-based organic solvent such as ethanol, at the concentration within the above range.

According to the acid-treating of the overlithiated lithium transition metal oxide, hydrogen (H) ions may be substituted for Li ions in a $Li_2MO_3$ phase of the overlithiated lithium transition metal oxide. A case that H ions are substituted from Li ions in a $LiM'O_2$ phase, instead of the $Li_2MO_3$ phase according to the acid-treating, will be described later with Examples.

In some embodiments, the acid-treated overlithiated lithium transition metal oxide may be further selectively dried at a temperature in a range of about 100° C. to about 200° C. Here, the drying of the overlithiated lithium transition metal oxide may be performed in air.

Next, the acid-treated overlithiated lithium transition metal oxide may be fluorine-doped using a fluorine compound.

In the case of the overlithiated lithium transition metal oxide that is doped with fluorine first followed by being acid-treated, an organic acid is used in an organic solvent such ethanol to obtain effects of the acid treatment. However, an organic acid may not be used in an actual process of mass production of a lithium battery. Alternatively, in the case of the overlithiated lithium transition metal oxide that is acid-treated first followed by being doped with fluorine, a non-organic acid such as LiF and $NH_4F$ is used in a solvent such as water to carry out the acid-treating. The overlithiated lithium transition metal oxide of the latter case may have insignificantly degraded an electrochemical property and caused a structural change of a lithium battery, and accordingly, the rate property of a lithium battery may be further improved.

In some embodiments, the applying of the fluorine onto the acid-treated overlithiated lithium transition metal oxide may be performed by using a doping solution containing at least one fluorine compound selected from lithium fluoride (LiF), magnesium fluoride ($MgF_2$), strontium fluoride ($SrF_2$), beryllium fluoride ($BeF_2$), calcium fluoride ($CaF_2$), ammonium fluoride ($NH_4F$), ammonium bifluoride ($NH_4HF_2$), and ammonium hexafluoroaluminate (($NH_4$)$_3$AlF$_6$).

In some embodiments, the doping solution may be prepared by dissolving the fluorine compound in water that is used as a standard solvent. The fluorine compound may be contained in the doping solution at a weight ratio in a range of about 0.01 wt % to about 10 wt % based on a total weight of the doping solution. For example, the fluorine compound may be contained in the doping solution at a weight ratio in a range of about 0.5 wt % to about 5 wt % based on a total weight of the doping solution.

In some embodiments, the acid-treated overlithiated lithium transition metal oxide may be added to the prepared doping solution, and the mixed solution may be stirred for about 1 to about 72 hours.

In some embodiments, the method may further include heat-treating the fluorine-doped overlithiated lithium transition metal oxide. The heat-treating of the fluorine-doped overlithiated lithium transition metal oxide may be, for example, performed in an nitrogen atmosphere at a temperature in a range of about 200° C. to about 500° C. For example, the heat-treating of the fluorine-doped overlithiated lithium transition metal oxide may be performed at a temperature in a range of about 300° C. to about 400° C.

According to another aspect, a composite positive active material may be manufactured according to the method described above.

In some embodiments, the composite positive active material may include fluorine distributed in an inner surface of particles forming the composite active material.

According to another aspect, a positive electrode includes the above-described composite positive electrode active material.

The positive electrode may be, for example, manufactured by preparing a positive active material composition by mixing the above-described composite positive electrode active material, a conductive agent, and a binder, with a solvent. A coating or drying of the formed positive active material composition may be directly applied onto a positive electrode current collector to prepare a positive plate in which a positive active material layer is formed. In some embodiments, the formed positive active material composition may be cast on a separate support, and then, the positive electrode current collector may be laminated with a positive active material film exfoliated from the support to prepare a positive plate in which a positive active material layer is formed.

In some embodiments, the conductive agent may use carbon black, graphite particles, natural graphite, artificial graphite, acetylene black, ketjen black, carbon fiber; carbon nanotube; metal powder, metal fiber, or metal tube of copper, such as copper, nickel, aluminum, or silver; or a conductive polymer such as a polyphenylene derivative, but the conductive agent is not limited thereto. Any conductive agent available in the art may be used.

In some embodiments, the binder may use vinylidene fluoride/hexafluoropropylene copolymer, polyvinylidene fluoride, polyacrylonitrile, polymethylmethacrylate, polytetrafluoroethylene (PTFE), a mixture thereof, or styrene butadiene rubber polymer. In some embodiments, the solvent may use N-methyl-pyrrolidone (NMP), acetone, or water, but the solvent is not limited thereto. Any binder and solvent available in the art may be used.

In some embodiments, the positive electrode active composition may further include a platicizer to form pores inside an electrode plate.

The amounts of the composite positive active material, the conductive agent, the binder, and the solvent may be typical levels used for a lithium battery of the related art. According to the intended use and structure of a lithium battery, at least one of the conductive agent, the binder, and the solvent may be omitted.

The positive electrode may further include a typical positive active material other than the above-described composite positive active material.

The typical positive active material may be a Li-containing metal oxide, and any positive active material available in the art may be used. For example, the Li-containing metal oxide may be at least one of composite oxides including lithium and a metal selected from Co, Mn, Ni, and a combination thereof. In some embodiments, the Li-containing metal oxide may be represented by at least one formula selected from $Li_aA_{1-b}B^1{}_bD^1{}_2$ (wherein $0.90 \leq a \leq 1$ and $0 \leq b \leq 0.5$); $Li_aE_{1-b}B^1{}_bO_{2-c}D^1{}_c$ (wherein $0.90 \leq a \leq 1$, $0 \leq b \leq 0.5$, and $0 \leq c \leq 0.05$); $LiE_{2-b}B^1{}_bO_{4-c}D^1{}_c$ (wherein $0 \leq b \leq 0.5$ and $0 \leq c \leq 0.05$); $Li_aNi_{1-b-c}Co_bB^1{}_cD^1{}_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB^1{}_cO_{2-\alpha}F^1{}_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB^1{}_cO_{2-\alpha}F^1{}_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB^1{}_cD^1{}_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB^1{}_cO_{2-\alpha}F^1{}_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_cMn_dGeO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$ and $0.001 \leq b \leq 0.1$); $Li_aCoG_bO_2$ (wherein $0.90 \leq a \leq 1$ and $0.001 \leq b \leq 0.1$); $Li_aMnG_bO_2$ (wherein $0.90 \leq a \leq 1$ and $0.001 \leq b \leq 0.1$); $Li_aMn_2G_bO_4$ (wherein $0.90 \leq a \leq 1$ and $0.001 \leq b \leq 0.1$); $QO_2$; $QS_2$; $LiQS_2$; $V_2O_5$; $LiV_2O_5$; $LiI^1O_2$; $LiNiVO_4$; $Li_{(3-f)}J_2(PO_4)_3$ ($0 \leq f \leq 2$); $Li_{(3-f)}Fe_2(PO_4)_3$ (wherein $0 \leq f \leq 2$); and $LiFePO_4$.

In formulae above, A may be Ni, Co, Mn, or a combination thereof; $B^1$ may be Al, Ni, Co, Mn, Cr, Fe, Mg, Sr, V, a rare earth element, or a combination thereof; $D^1$ may be oxygen (O), fluorine (F), sulfur (S), phosphorus (P), or a combination thereof; E may be Co, Mn, or a combination thereof; $F^1$ may be fluorine (F), sulfur (S), phosphorus (P), or a combination thereof; G may be Al, Cr, Mn, Fe, Mg, lanthanum (La), cerium (Ce), strontium (Sr), V, or a combination thereof; Q may be Ti, Mo, Mn, or a combination thereof; $I^1$ may be Cr, V, Fe, scandium (Sc), yttrium (Y), or a combination thereof; J may be V, Cr, Mn, Co, Ni, Cu, or a combination thereof.

For example, the Li-containing metal oxide may be $LiCoO_2$, $LiMn_xO_{2x}$ (wherein $x=1, 2$), $LiNi_{1-x}Mn_xO_{2x}$ (wherein $0<x<1$), $LiNi_{1-x-y}Co_xMn_yO_2$ (wherein $0 \leq x \leq 0.5$ and $0 \leq y \leq 0.5$), or $FePO_4$.

In some embodiments, the Li-containing metal oxide may be a compound including a coating layer on a surface of the compound, or may be a mixture of the Li-containing metal oxide and a compound including a coating layer. In some embodiments, the coating layer may include a coating element compound selected from oxides of the coating element, hydroxides of the coating element, oxyhydroxides of the coating element, oxycarbonates of the coating element, or hydroxycarbonates of the coating element. In some embodiments, the compound forming the coating layer may be either amorphous or crystalline. In some embodiments, the coating element included in the coating layer may be selected from Mg, Al, Co, potassium (K), sodium (Na), calcium (Ca), silicon (Si), Ti, V, Sn, Ge, gallium (Ga), B, arsenic (As), Zr, or a mixture thereof. In some embodiments, the formation of the coating layer may be performed according to a method (e.g., spray coating, immersing, etc.) using these elements with the positive active material, so long as the method does not cause any undesirable side effect regarding properties of the positive active material. Such a method will be well understood by one of ordinary skill in the art, and thus, a detailed description of the method will be omitted.

In some embodiments, the positive electrode current collector is formed to have a thickness in a range of about 3 μm to about 500 μm. The positive electrode current collector is not particularly limited as long as the positive electrode current collector is conductive without causing adverse chemical changes in the manufactured battery. Examples of the positive electrode current collector include copper, stainless steel, aluminum, nickel, titanium, calcined carbon, a copper surface, or a stainless steel surface-treated with carbon, nickel, titanium, or silver, or aluminum-cadmium alloys. In addition, fine irregularities may be included on the surface of the positive electrode current collector so as to enhance adhesion of the surface of the positive electrode current collector to the positive active material. In addition, the positive electrode current collector may be used in various forms including films, sheets, foils, nets, porous structures, foams, and non-woven fabrics.

In some embodiments, the positive electrode may have a mixture density of at least 2.0 g/cc.

According to another aspect, a lithium battery includes a positive electrode including the composite positive active material. The lithium battery may include, for example, a positive electrode including the composite positive active material; a negative electrode disposed opposite to the positive electrode; and an electrolyte interposed between the positive electrode and the negative electrode.

The positive electrode included in the lithium battery may be manufactured according to the above-described method.

Then, a negative electrode may be manufactured in the following manner. The negative electrode may be manufactured in the same manner as used to manufacture the positive electrode, except that a negative active material is used instead of the positive active material. In addition, a conductive agent, a binder, and a solvent used in a negative active material composition may be the same as those used in the positive active material composition.

For example, a negative active material, a binder, a solvent, and selectively a conductive agent are mixed to prepare a negative active material composition. Then, a coating of the negative active material composition may be directly applied onto a negative electrode current collector to prepare a negative plate. Alternatively, the formed negative active material composition may be cast on a separate support, and then, the negative electrode current collector may be laminated with a negative active material film exfoliated from the support to prepare a negative plate.

The negative active material may be any one of various materials that are used as a negative active material for a lithium battery in the art. For example, the negative active material may include at least one material selected from the group consisting of lithium metal, lithium-alloyable metal, transition metal oxide, non-transition metal oxide, and a carbonaceous material.

For example, the lithium-alloyable metal may be Si, Sn, Al, Ge, lead (Pb), bismuth (Bi), antimony (Sb) a Si—Y alloy (where Y is an alkali metal, an alkali earth metal, a Group 13 element, a Group 14 element a transition metal, a rare-earth element, or a combination thereof, and Y is not Si), or a Sn—Y alloy (wherein Y is an alkali metal, an alkali earth metal, a Group 13 element, a Group 14 element, a transition metal, a rare-earth element, or a combination element thereof, and Y is not Sn). In some embodiments, the element Y may be Mg, Ca, Sr, barium (Ba), radium (Ra), Sc, Y, Ti, Zr, hafnium (Hf), rutherfordium (Rf), V, Nb, tantalum (Ta), dubnium (Db), Cr, Mo, tungsten (W), seaborgium (Sg), technetium (Tc), Re, bohrium (Bh), Fe, Pb, Ru, osmium (Os), hassium (Hs), rhodium (Rh), iridium (Ir), palladium (Pd), Pt, Cu, silver (Ag), gold (Au), Zn, cadmium (Cd), B (boron), Al, Ga, Sn, indium (In), Ti, Ge, P (phosphorus), As, Sb, Bi, S (sulfur), selenium (Se), tellurium (Te), polonium (Po), or a combination thereof.

For example, the transition metal oxide may be lithium titanium oxide, vanadium oxide, or lithium vanadium oxide.

For example, the non-transition metal oxide may be $SnO_2$ or $SiO_x$ (wherein $0<x<2$).

In some embodiments, the carbonaceous material may be crystalline carbon, amorphous carbon, or a mixture thereof. In some embodiments, the crystalline carbon may be natural or artificial graphite that is amorphous, tabular, flake-like, circular, or fibrous, and the amorphous carbon may be soft carbon (low calcined carbon) or hard carbon, meso-phase pitch carbide, or calcined cork.

The amounts of the negative active material, the conductive agent, the binder, and the solvent may be typical levels used for a lithium battery of the related art.

In some embodiments, the negative electrode current collector is formed to have a thickness in a range of about 3 μm to about 500 μm. The negative electrode current collector is not particularly limited as long as the negative electrode current collector is conductive without causing adverse chemical changes in the manufactured battery. Examples of the negative electrode current collector include copper, stainless steel, aluminum, nickel, titanium, calcined carbon, a copper surface, or a stainless steel surface-treated with carbon, nickel, titanium, or silver, or aluminum-cadmium alloys. In addition, fine irregularities may be included on the surface of the negative electrode current collector so as to enhance adhesion of the surface of the negative electrode current collector to the to the negative active material. In addition, the negative electrode current collector may be used in various forms including films, sheets, foils, nets, porous structures, foams, and non-woven fabrics.

Then, a separator to be inserted between the positive electrode and the negative electrode may be prepared. The separator may be any one of various separators that are used in a typical lithium battery. For example, a material that has low resistance to ion migration of an electrolyte and has an excellent electrolytic solution retaining capability is suitable for forming the separator. For example, a material for forming the separator may be selected from glass fiber, polyester, polyethylene, polypropylene, polytetrafluoroethylene (PTFE), and a combination thereof, each of which may be in a non-woven fabric or woven fabric form. Pores included in the separator may have a diameter in a range of about 0.01 μm to about 10 μm, and the separator may have a thickness in a range of about 5 μm to about 300 μm.

The electrolyte consists of a non-aqueous electrolyte and a lithium salt. The non-aqueous electrolyte may be a non-aqueous electrolytic solution, an organic solid electrolyte, an inorganic solid electrolyte, or the like.

The non-aqueous electrolyte solution may be, for example, an aprotic organic solvent, and examples thereof include N-methyl-2-pyrrolidinone, propylene carbonate, ethylene carbonate, butylene carbonate, dimethyl carbonate, diethyl carbonate, gamma-butyrolacton, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, triester phosphate, trimethoxy methane, dioxolane derivative, sulfolane, methyl sulfolane, 1,3-dimethyl-2-imidazolidinone, propylene carbonate derivative, tetrahydrofurane derivative, ether, methyl propionate, and ethyl propionate.

The organic solid electrolyte may be, for example, a polyethylene derivative, a polyethylene oxide derivative, a polypropylene oxide derivative, a phosphate ester polymer, a polyagitation lysine, polyester sulfide, polyvinyl alcohol, poly fluoro vinylidene, or an ionic decomposer-containing polymer.

The inorganic solid electrolyte may be, for example, nitrides, halids, sulfates, and silicates of Li, such as $Li_3N$, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, or Li$_3$PO$_4$—Li$_2$S—SiS$_2$.

The lithium salt may be any one of various lithium salts that are typically used in a lithium battery, and one or more lithium salts that are easily dissolved in the non-aqueous based electrolyte may be used. Examples of the lithium slat include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, low aliphatic lithium carbonate, 4 phenyl lithium borate, and lithium imide.

In some embodiments, the lithium battery may be a lithium ion battery, a lithium ion polymer battery, or a lithium polymer battery, a classified according to the types of the separator and the electrolyte being used, a cylindrical battery, a rectangular battery, a coin-shape battery, or a pouch-shape battery, classified according to the shape of the separator and the electrolyte being used; or a bulky battery or a thin-film type battery, classified according to the size of the separator and the electrolyte being used.

Methods of manufacturing these batteries are widely known in the art, and thus, a detailed description of the methods will be omitted.

FIG. 1 is a schematic view illustrating a lithium battery 30 according to an embodiment.

Referring to FIG. 1, the lithium battery 30 includes a positive electrode 23, a negative electrode 22, and a separator 24 disposed between the positive electrode 23 and the negative electrode 22. In some embodiments, the positive electrode 23, the negative electrode 22, and the separator 24 are wound or folded to be placed in a battery case 25. Subsequently, an electrolyte is injected into the battery case 25 and the resultant structure is sealed with an encapsulation member 26, thereby completing the manufacturing of the lithium battery 30. In some embodiments, the battery case 25 may be cylindrical, rectangular, or thin-film shaped. In some embodiments, the lithium battery may be a lithium ion battery.

In some embodiments, the lithium battery may be suitable for electric vehicles requiring a high capacity battery, a high-power output, and high temperature operation, in addition to existing mobile phones and portable computers. In some embodiments, the lithium battery may be combined with a typical internal combustion engine, a fuel battery, or a super capacitor for use in hybrid vehicles. In some embodiments, the lithium battery may be suitable for any application for electric bicycles, power tools, and other uses requiring high output, high voltage, and high temperature operation.

Embodiments are further described in detail with Examples and Comparative Examples. However, Examples are presented herein for illustrative purposes only and should not be considered limiting.

Example 1

Acid Treatment to OLO

A material having 0.55Li$_2$MnO$_3$-0.45LiNi$_{0.5}$Co$_{0.2}$Mn$_{0.3}$O$_2$ composition was used as an over-lithiated oxide (OLO). The OLO (10 g) was added to a 0.2M HNO$_3$ solution (500 mL), and the mixture was stirred for 4 minutes. The mixture was filtered using a vacuum filter to remove the solvent, followed by being dried at a temperature of 120° C., thereby obtaining an acid-treated OLO.

Fluorine Doping

The acid-treated OLO (10 g) was added to a LiF 1 wt % solution (500 mL), and the mixture was stirred at a temperature of 50° C. for 24 hours. Subsequently, the mixture was filtered using a vacuum filter to remove the solvent, followed by being dried at a temperature of 80° C. Then, in a nitrogen atmosphere, the resultant product was subjected to heat treatment at a temperature of 300° C. for 5 hours. After completing the heat treatment, a fluorine-doped OLO was obtained.

Manufacture of Coin Half-Cell

In order to confirm charging and discharging properties and voltage effects of the fluorine-doped OLO, a coin half-cell was manufactured in the following manner.

After powder of the fluorine-doped OLO was uniformly mixed with a carboneous conductive agent (Super-P; Timcal Ltd., Bodio, Switzerland) at a weight ratio of 90:5, a polyvinylidene fluoride (PVDF) binder solution was added to the mixture so as to prepare a slurry including the active material, the carboneous conductive agent, and the binder at a weight ratio of 90:5:5.

The active material slurry was coated on 15 μm-thick aluminum foil, and dried to form a positive electrode plate. Additionally, the positive electrode plate was vacuum-dried to form a 2032 coin half-cell having a diameter of 12 mm.

In manufacturing the 2032 coin half-cell, lithium metal was used as a counter electrode, a polypropylene separator (Celgard 3501, Celgard, LLC, Charlotte, N.C.) was used as a separator, and an electrolyte used herein was prepared by dissolving 1.3M LiPF$_6$ in a solvent mixture including ethylenecarbonate (EC) and diethylcarbonate (DEC) at a volume ratio of 3:7.

Example 2

A coin half-cell was manufactured in the same manner as in Example 1, except that the acid-treated OLO was doped with fluorine using a LiF 2 wt % solution.

Example 3

A coin half-cell was manufactured in the same manner as in Example 1, except that the acid-treated OLO was doped with fluorine using a LiF 4 wt % solution.

Example 4

A coin half-cell was manufactured in the same manner as in Example 1, except that the acid-treated OLO was doped with fluorine using a NH$_4$F 2 wt % solution.

Example 5

A coin half-cell was manufactured in the same manner as in Example 1, except that the acid-treated OLO was doped with fluorine using a NH$_4$F 5 wt % solution.

Example 6

A coin half-cell was manufactured in the same manner as in Example 1, except that the acid-treated OLO was doped with fluorine using a NH$_4$F 10 wt % solution.

Comparative Example 1

A coin half-cell was manufactured in the same manner as in Example 1, except that the OLO having 0.55Li$_2$MnO$_3$-

$0.45LiNi_{0.5}Co_{0.2}Mn_{0.3}O_2$ composition was not subjected to the acid treatment nor the fluorine doping.

Comparative Example 2

A coin half-cell was manufactured in the same manner as in Example 1, except that the OLO having $0.55Li_2MnO_3$-$0.45LiNi_{0.5}Co_{0.2}Mn_{0.3}O_2$ composition was subjected to the acid treatment without the fluorine doping.

Comparative Example 3

A coin half-cell was manufactured in the same manner as in Example 1, except that the OLO having $0.55Li_2MnO_3$-$0.45LiNi_{0.5}Co_{0.2}Mn_{0.3}O_2$ composition was subjected to the fluorine doping using a $NH_4F$ 4 wt % solution, without the acid treatment.

Comparative Example 4

A coin half-cell was manufactured in the same manner as in Example 1, except that the OLO having $0.55Li_2MnO_3$-$0.45LiNi_{0.5}Co_{0.2}Mn_{0.3}O_2$ composition was subjected to the fluorine doping using a LiF 4 wt % solution, without the acid treatment.

Comparative Example 5

A coin half-cell was manufactured in the same manner as in Example 1, except that the OLO having $0.55Li_2MnO_3$-$0.45LiNi_{0.5}Co_{0.2}Mn_{0.3}O_2$ composition was treated in a different order, and that is, the OLO was fluorine-doped using a LiF 4 wt % solution, followed by being acid-treated using a 0.2M $HNO_3$ solution.

Evaluation Example 1: SIMS Analysis on Positive Active Material

Figure 2:
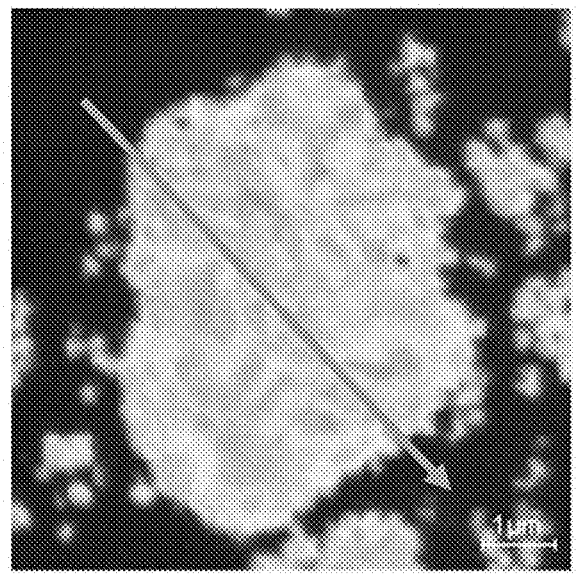
FIG. 2 is a secondary ion mass spectrometry (SIMS) image of an overlithiated oxide (OLO) manufactured according to Example 1.

The results of secondary ion mass spectrometry (SIMS) measurement analyzing the fluorine-doped OLO of Example 1 were shown in FIG. 2. The results of SIMS line mapping analysis measured according to the direction of the arrow shown in FIG. 2 were shown in FIG. 3.

Figure 3:
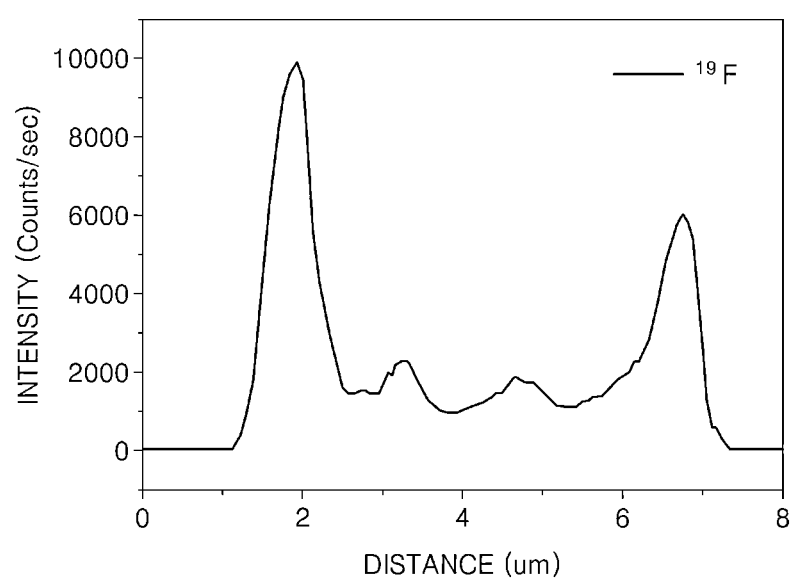
FIG. 3 is a graph showing the results of SIMS line mapping analyzing the SIMS image of FIG. 2.

Referring to FIG. 3, it was confirmed that the fluorine was mainly distributed on the surface of the OLO. This result confirms that the OLO was surface-treated by fluorine.

Evaluation Example 2: Evaluation of Battery Property

Initial efficiency (I.E.), capacity and rate properties were measured with respect to the coin cells of Examples 1-6 and Comparative Examples 1-5, and the results of the measurement were shown in Table 1.

Regarding charge and discharge experiments, a 2032 coin half-cell that has used a lithium metal as a negative electrode was used. Here, a loading level (LL) of the positive electrode was fixed to be in a range of 5.0 mg/cm$^2$ to 5.5 mg/cm$^2$. Regarding the charge and discharge capacity during the first cycle of charging and discharging the coin half-cell, the coin half-cell was charged by flowing a constant current at 0.1 C rate until the voltage of the coin half-cell reached 4.7 V (cc mode), and then, discharged at the same current flow rate of the charging until the voltage reached 2.5 V (cc mode) (formation process). In order to measure the rate property of the coin half-cell, the coin half-cell was charged by flowing a constant current at 0.5 C rate until the voltage of the coin half-cell reached 4.6 V (cc-cv mode, 0.05 c cut). Then, in order to measure the discharge capacity of the coin half-cell, the coin half-cell was discharged by flowing a constant current at 0.2 C, 0.33 C, 1 C, 2 C, and 3 C when the voltage reached 2.5 V (cc mode). Here, I.E. is defined an equation [discharge capacity at the first cycle]/[charge capacity at the first cycle], and accordingly, the rate properties of the coin half-cell were defined according to the ratio of the discharge capacity as shown in Table 1 below.

TABLE 1

| | | 1$^{st}$ Cycle | | | Rate property | | | | | |
|---|---|---|---|---|---|---|---|---|---|---|
| | Sample Name | 0.1C (mAh/g) | 0.1D (mAh/g) | I.E. | 0.2D (mAh/g) | 0.5D (mAh/g) | 1D (mAh/g) | 2D (mAh/g) | 1D/0.1D | 2D/0.2D |
| Example 1 | Acid treatment + LiF 1 wt % | 281.42 | 270.16 | 0.96 | 243.68 | 220.82 | 201.36 | 172.20 | 0.75 | 0.71 |
| Example 2 | Acid treatment + LiF 2 wt % | 285.40 | 270.90 | 0.95 | 245.32 | 224.60 | 202.59 | 177.42 | 0.75 | 0.72 |
| Example 3 | Acid treatment + LiF 4 wt % | 282.19 | 268.08 | 0.95 | 243.22 | 220.13 | 200.56 | 169.30 | 0.75 | 0.70 |
| Example 4 | Acid treatment + NH$_4$F 2 wt % | 287.19 | 274.25 | 0.96 | 249.99 | 231.10 | 211.62 | 185.48 | 0.77 | 0.74 |
| Example 5 | Acid treatment + NH$_4$F 5 wt % | 283.95 | 266.91 | 0.94 | 240.18 | 217.65 | 195.36 | 166.58 | 0.73 | 0.69 |
| Example 6 | Acid treatment + NH$_4$F 10 wt % | 271.36 | 252.36 | 0.93 | 236.49 | 213.65 | 189.56 | 153.25 | 0.75 | 0.65 |
| Comparative Example 1 | Pristine | 295.23 | 257.44 | 0.87 | 235.82 | 209.03 | 184.05 | 155.94 | 0.71 | 0.66 |
| Comparative Example 2 | Acid treatment only | 279.05 | 268.22 | 0.96 | 242.41 | 219.86 | 197.70 | 168.90 | 0.74 | 0.70 |
| Comparative Example 3 | NH$_4$F 2% | 276.2 | 247.3 | 0.90 | 223.8 | 214.8 | 178.9 | 148.8 | 0.72 | 0.66 |
| Comparative Example 4 | LiF 4 wt % | 295.73 | 263.23 | 0.89 | 241.65 | 236.32 | 209.46 | 191.56 | 178.66 | 0.80 |
| Comparative Example 5 | LiF 4 wt % + Acid treatment | 275.65 | 208.26 | 0.76 | 183.37 | 173.86 | 152.65 | 136.55 | 126.54 | 0.73 |

Referring to Table 1, it was confirmed that the OLO that was doped with fluorine after being acid-treated have improved initial efficiencies and rate properties compared to those that were not treated with anything. In addition, it was found that the OLO active materials that were added to LiF or NH$_4$F without being acid-treated tend to decrease the capacity properties.

In the case that the OLO active materials that were doped with fluorine after being acid-treated, it was confirmed that the OLO active materials have improved initial efficiencies and rate properties by adjusting the amount of fluorine, compared to those that were acid-treated only, those that were doped with fluorine only, or those that were treated in a different order, i.e., those that were acid-treated after being doped with fluorine. For example, in the case of the OLO active materials that were doped with fluorine after being acid-treated, the OLO active materials may have improved rate properties by adjusting the amount of LiF to be 4 wt % or less, or the amount of NH$_4$F to be 5 wt % or less.

Evaluation Example 3: XRD Measurement

Regarding the positive active material manufactured according to Example 1 to 6 and Comparative Example 1 to 5, the results of X-ray diffraction (XRD) measurement are shown in Table 2 below.

TABLE 2

| Samples Name | | a, Å | c, Å | V, Å | c/a |
|---|---|---|---|---|---|
| Example 1 | Acid treatment + LiF 1 wt % | 2.85649(5) | 14.2599(6) | 100.76(1) | 4.992 |
| Example 2 | Acid treatment + LiF 2 wt % | 2.85651(5) | 14.2619(6) | 100.78(1) | 4.993 |
| Example 3 | Acid treatment + LiF 4 wt % | 2.85698(5) | 14.2654(6) | 100.84(1) | 5.098 |
| Example 4 | Acid treatment + NH$_4$F 2 wt % | 2.85652(6) | 14.2611(7) | 100.77(1) | 4.992 |
| Example 5 | Acid treatment + NH$_4$F 5 wt % | 2.85692(6) | 14.2711(7) | 100.87(1) | 4.995 |
| Example 6 | Acid treatment + NH$_4$F 10 wt % | 2.85699(6) | 14.2756(7) | 100.91(1) | 4.997 |
| Comparative Example 1 | Pristine | 2.85562(5) Å | 14.2470(6) | 100.61(1) | 4.989 |
| Comparative Example 2 | Acid treatment only | 2.85752(5) | 14.2549(6) | 100.80(1) | 4.989 |
| Comparative Example 3 | NH$_4$F 2% | 2.85553(5) Å | 14.2469(6) | 100.60(1) | 4.989 |
| Comparative Example 4 | LiF 4 wt % | 2.85359(3) | 14.2364(4) | 100.39(1) | 4.989 |
| Comparative Example 5 | LiF 4 wt % + Acid treatment | 2.85376(4) | 14.2363(4) | 100.41(1) | 4.989 |

Referring to Table 2, it was confirmed that the length of the c-axis which is significantly relevant to the rate property was extended according to the addition of fluorine atom (F). However, in the case of a large amount of fluorine atoms being added, the length of the c-axis was extended, but there may be degradation of electrochemical properties of the OLO active material due to the by-products precipitation on the surface of the OLO active materials.

As described above, according to the one or more of the above embodiments, a method of manufacturing a composite positive active material may have improved a rate property of a lithium battery by extending a length of a c-axis that is significantly relevant to the rate property with respect to an overlithiated lithium transition metal oxide It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:
1. A method of manufacturing a composite positive active material, the method comprising:
   acid-treating an overlithiated lithium transition metal oxide represented by Formula 1 or Formula 2;
   applying fluorine onto the acid-treated overlithiated lithium transition metal oxide; and
   drying the acid-treated overlithiated lithium transition metal oxide at a temperature in a range of 100° C. to about 200° C. after the acid-treating of the overlithiated lithium transition metal oxide and before the applying of the fluorine onto the acid-treated overlithiated lithium transition metal oxide:

$$x\text{Li}_2\text{MO}_3\text{-}(1-x)\text{LiM'O}_2 \qquad \text{Formula 1}$$

wherein M has an average oxidation number +4 and is at least one transition metal selected from a Group 4 transition metal and a Group 5 transition metal of the Periodic Table, M' has an average oxidation number +3 and is selected from a Group 4 transition metal and a Group 5 transition metal of the Periodic Table, and $$0 < x < 1$$

$$x\text{Li}_2\text{MO}_3\text{-}x'\text{LiM'O}_2\text{-}x''\text{Li}_{1+d}\text{M''}_{2-d}\text{O}_4 \qquad \text{Formula 2}$$

wherein M has an average oxidation number +4 and is at least one transition metal selected from a Group 4 transition metal and a Group 5 transition metal of the Periodic Table, M' has an average oxidation number +3 and is at least one transition metal selected from a Group 4 transition metal and a Group 5 transition metal of the Periodic Table, M" has mixed average oxidation numbers +3 and +4 and is at least one transition metal selected from a Group 4 transition metal and a Group 5 transition metal of the Periodic Table, and $x+x'+x''=1$; $0<x<1$, $0<x'<1$, $0<x''<1$; and $0<d<0.33$.

2. The method of claim 1, wherein M is at least one metal selected from manganese (Mn), titanium (Ti), zirconium (Zr), tin (Sn), and molybdenum (Mo).

3. The method of claim 1, wherein M' at least one metal selected from nickel (Ni), cobalt (Co), manganese (Mn), iron (Fe), aluminum (Al), magnesium (Mg), zinc (Zn), copper (Cu), chromium (Cr), vanadium (V), and niobium (Nb).

4. The method of claim 1, wherein the overlithiated lithium transition metal oxide is represented by Formula 3:

$$xLi_2MnO_3\text{-}(1-x)LiNi_aCo_bMn_cO_2 \qquad \text{Formula 3}$$

wherein $0<x<1$, $0<a<1$, $0<b<1$, $0<c<1$, and $a+b+c=1$.

5. The method of claim 1, wherein an average particle diameter of the overlithiated lithium transition metal oxide is in a range of about 10 nm to about 500 μm.

6. The method of claim 1, wherein the acid-treating of the overlithiated lithium transition metal oxide is performed by using an acidic solution containing at least one acid selected from nitric acid, sulfuric acid, hydrochloric acid, citric acid, fumaric acid, maleic acid, boric acid ($H_3BO_3$), and phosphoric acid.

7. The method of claim 1, wherein the applying of the fluorine on the acid-treated overlithiated lithium transition metal oxide is performed by using a doping solution containing at least one fluorine compound selected from lithium fluoride (LiF), magnesium fluoride ($MgF_2$), strontium fluoride ($SrF_2$), beryllium fluoride ($BeF_2$), calcium fluoride ($CaF_2$), ammonium fluoride ($NH_4F$), ammonium bifluoride ($NH_4HF_2$), and ammonium hexafluoroaluminate (($NH_4)_3AlF_6$).

8. The method of claim 7, wherein an amount of the fluorine compound is in a range of about 0.01 wt % to about 10 wt % based on a total amount of the doping solution.

9. The method of claim 1, further comprising heat-treating the fluorine-doped overlithiated lithium transition metal oxide at a temperature in a range of about 200° C. to about 500° C. in air.

10. A composite positive active material manufactured by the method of claim 1.

11. A lithium battery comprising:
a positive electrode comprising the composite positive active material of claim 10;
a negative electrode disposed opposite to the positive electrode; and
an electrolyte disposed between the positive electrode and the negative electrode.

12. The lithium battery of claim 11, wherein M is at least one metal selected from manganese (Mn), titanium (Ti), zirconium (Zr), tin (Sn), and molybdenum (Mo).

13. The lithium battery of claim 11, wherein M' at least one metal selected from nickel (Ni), cobalt (Co), manganese (Mn), iron (Fe), aluminum (Al), magnesium (Mg), zinc (Zn), copper (Cu), chromium (Cr), vanadium (V), and niobium (Nb).

14. The lithium battery of claim 11, wherein the overlithiated lithium transition metal oxide is represented by Formula 3:

$$xLi_2MnO_3\text{-}(1-x)LiNi_aCo_bMn_cO_2 \qquad \text{Formula 3}$$

wherein $0<x<1$, $0<a<1$, $0<b<1$, $0<c<1$, and $a+b+c=1$.

15. The lithium battery of claim 11, wherein an average particle diameter of the overlithiated lithium transition metal oxide is in a range of about 10 nm to about 500 μm.

16. The lithium battery of claim 11, wherein the acid-treating of the overlithiated lithium transition metal oxide is performed by using an acidic solution containing at least one acid selected from nitric acid, sulfuric acid, hydrochloric acid, citric acid, fumaric acid, maleic acid, boric acid ($H_3BO_3$), and phosphoric acid.

17. The lithium battery of claim 11, wherein the acid-treating of the overlithiated lithium transition metal oxide is performed by using an acidic solution containing nitric acid.

18. The lithium battery of claim 11, wherein the applying of the fluorine on the acid-treated overlithiated lithium transition metal oxide is performed by using a doping solution containing at least one fluorine compound selected from lithium fluoride (LiF), magnesium fluoride ($MgF_2$), strontium fluoride ($SrF_2$), beryllium fluoride ($BeF_2$), calcium fluoride ($CaF_2$), ammonium fluoride ($NH_4F$), ammonium bifluoride ($NH_4HF_2$), and ammonium hexafluoroaluminate (($NH_4)_3AlF_6$).

19. The lithium battery of claim 11, wherein the applying of the fluorine on the acid-treated overlithiated lithium transition metal oxide is performed by using a doping solution containing at lithium fluoride (LiF) or ammonium fluoride ($NH_4F$).

* * * * *